Figure 1:
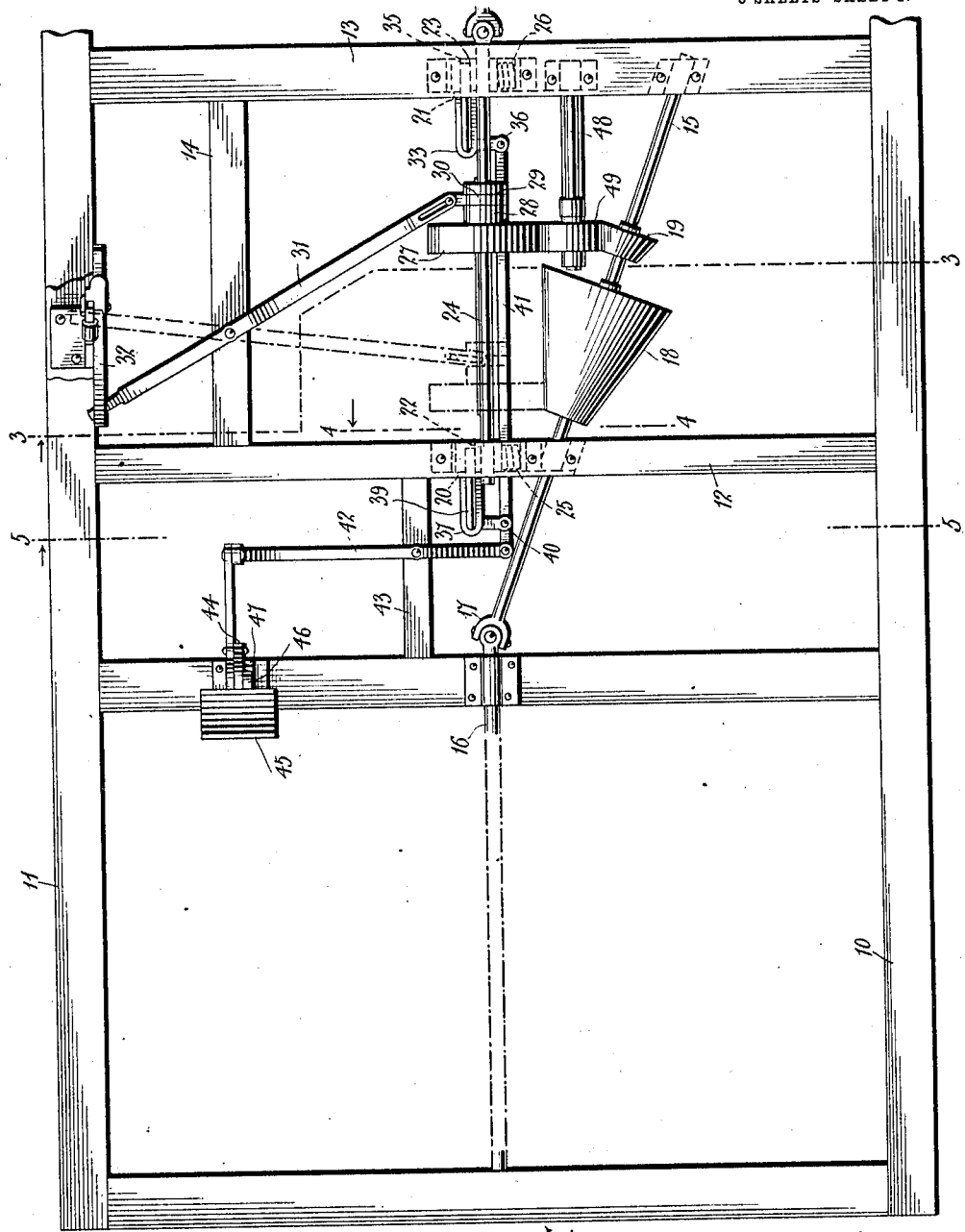

T. S. HUTCHINGS.
POWER TRANSMITTING MECHANISM.
APPLICATION FILED OCT. 30, 1911.

1,040,336.

Patented Oct. 8, 1912.

3 SHEETS—SHEET 1.

Witnesses

Inventor
T. S. Hutchings,
By
Attorneys

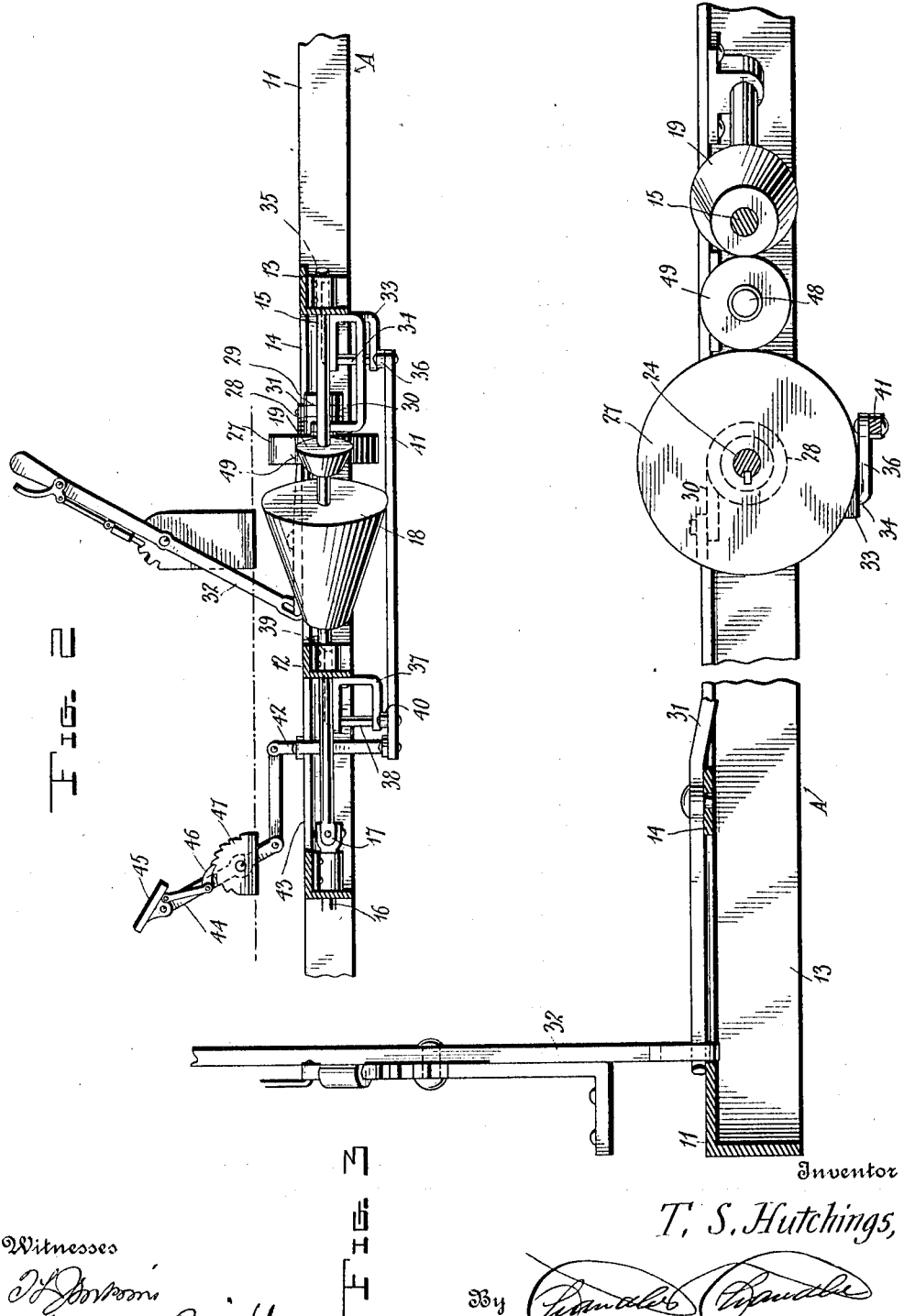

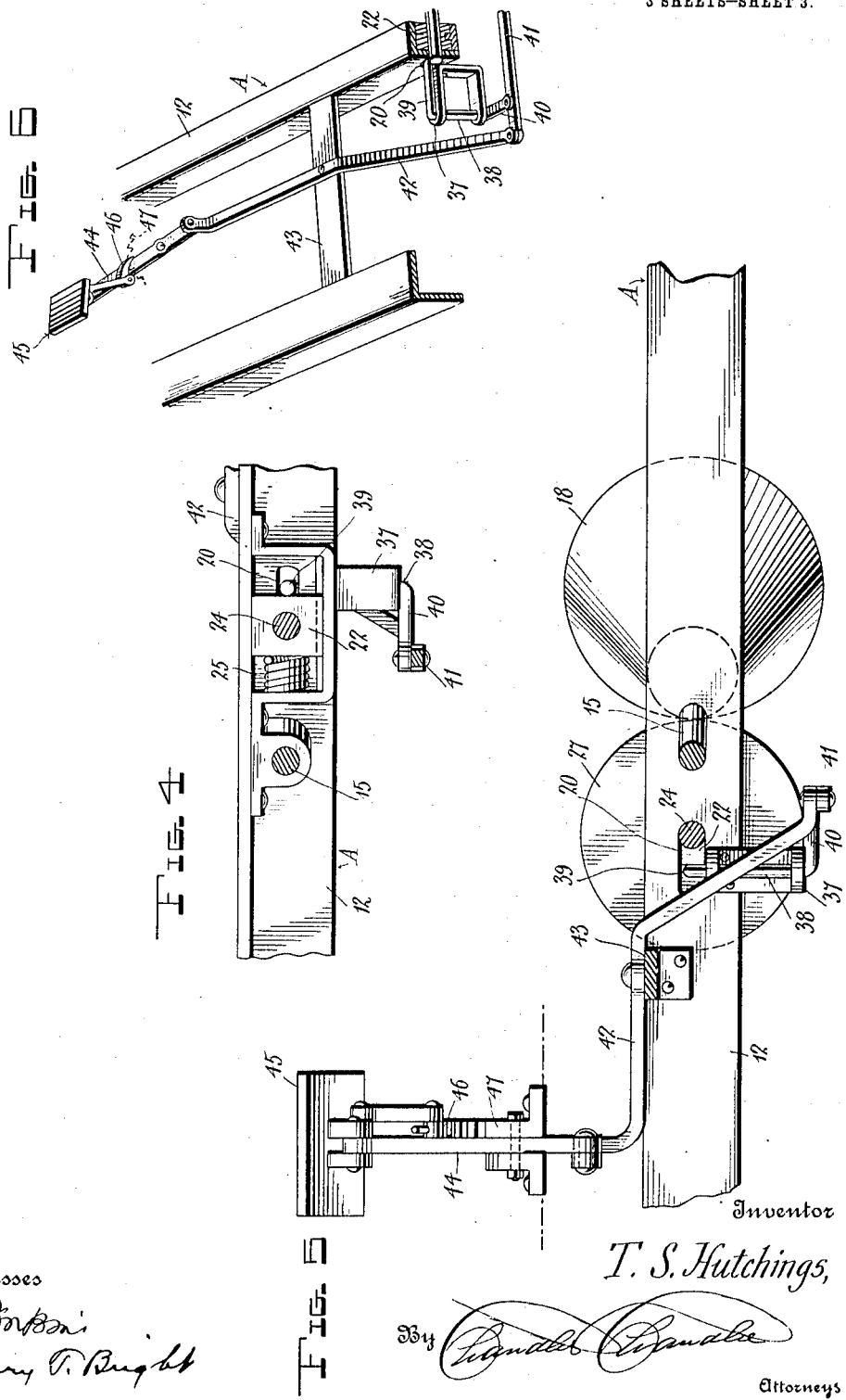

UNITED STATES PATENT OFFICE.

THED S. HUTCHINGS, OF HILTS, CALIFORNIA.

POWER-TRANSMITTING MECHANISM.

1,040,336. Specification of Letters Patent. Patented Oct. 8, 1912.

Application filed October 30, 1911. Serial No. 657,657.

*To all whom it may concern:*

Be it known that I, THED S. HUTCHINGS, a citizen of the United States, residing at Hilts, in the county of Siskiyou, State of California, have invented certain new and useful Improvements in Power-Transmitting Mechanisms; and I do hereby declare the following to be a full, clear, and exact description of the invention, such as will enable others skilled in the art to which it appertains to make and use the same.

This invention relates to power transmitting mechanisms, and more particularly to power transmitting mechanisms for automobiles.

The object of the invention resides in the provision of a power transmitting mechanism of the friction type which is capable of a wide range of adjustment for the purpose of varying the speed and also capable of adjustment for changing the direction of travel.

A further object of the invention resides in the provision of a power transmitting mechanism of the character referred to which will be simple in construction, efficient in use and which will be comparatively inexpensive to manufacture and keep in repair.

With the above and other objects in view, the invention consists in the details of construction and in the arrangement and combination of parts to be hereinafter more fully described and particularly pointed out in the appended claims.

In describing the invention in detail, reference will be had to the accompanying drawings wherein like characters of reference denote corresponding parts in the several views, and in which—

Figure 1 is a plan view of a portion of the frame of an automobile having the invention associated therewith, and showing the power transmitting mechanism in one adjustment in full lines and in other adjustments in dotted lines, Fig. 2, a side view of what is shown in Fig. 1 with a portion of the automobile frame removed, Fig. 3, a section on the line 3—3 of Fig. 1, Fig. 4, a section on the line 4—4 of Fig. 1, Fig. 5, a section on the line 5—5 of Fig. 1, and Fig. 6, a detail perspective view showing the pedal for throwing in the driven member and a portion of the connections between said pedal and the driven member.

Referring to the drawings, A indicates generally the frame of the automobile which includes side members 10 and 11 connected together at spaced points by cross members 12 and 13 which latter are connected together by a beam 14 disposed adjacent to and extending parallel with the side member 11. Journaled in the cross members 12 and 13 and extending diagonally of the frame A is a drive shaft 15 one end of which is connected to an engine shaft 16 by a universal joint 17. Fixed on the shaft 15 is a friction drive cone 18, one side of the friction conical face of which extends parallel to the longitudinal axis of the frame A. Also fixed upon the shaft 15 at the rear of the cone 18 is another drive cone 19 which is utilized when it is desired to reverse the direction of travel as will hereinafter appear. Formed at corresponding points in the cross members 12 and 13 are transverse passages 20 and 21 respectively in which are slidably mounted journal blocks 22 and 23, which latter rotatably support the terminals of a driven shaft 24. Disposed in the opening 20 is a spring 25 one end of which bears against the journal block 22 while the other end thereof bears against the adjacent end of the passage 20. Likewise, there is disposed in the passage 21 a spring 26 one end of which bears against the journal block 23 while the other end thereof bears against the adjacent end of the passage 21. These springs constantly tend to move the driven shaft 24 away from the shaft 15 and toward the side member 11 as will be obvious.

Splined upon the driven shaft 24 is a friction wheel 27 which during its movement longitudinally of the shaft 24 is adapted to engage different portions of the conical friction face of the cone 18. The springs 25 and 26 normally operate to move the shaft 24 bodily away from the shaft 15 so that when the friction wheel 27 is shifted longitudinally of said shaft it will not engage the friction cone 18. In order to adjust the friction wheel 27 longitudinally of the driven shaft 24, said friction wheel is provided at one end with a reduced extension 28 provided with a circumscribing groove 29. Loosely embracing the reduced extension 28 and having its arms disposed in the groove 29 is a forked yoke 30 the stem of which latter is pivotally connected to one end of the two arm lever 31. This lever 31 is pivotally mounted upon the beam 14 and has its other end pivotally connected to an operating lever 32 through the manipulation of which the lever 31 may be oscillated on its pivot and the friction wheel 27 in turn reciprocated longitudinally of the shaft 24 so as to engage different portions of the friction face of the cone 18 and thereby vary the speed of rotation of the shaft 24.

In order to shift the shaft 24 bodily against the influence of the springs 25 and 26 and bring the friction wheel 27 into position to engage the friction face of the cone 18 the following structure is resorted to. Depending from the cross member 13 is a bracket 33 in which is journaled a vertical rod 34. The upper end of the rod 34 terminates in an angular extension 35 which passes into the passage 21 in position to engage the end of the journaled block 23 opposite to that engaged by the spring 26. The lower end of the rod 34 also terminates in an angular extension 36 disposed substantially transversely of the frame A. Depending from the cross member 12 is another bracket 37 in which is journaled a vertical rod 38. The upper end of this rod 38 terminates in an angular extension 39 which passes into the passage 20 in the cross member 12 in position to engage the opposite end of the journal block 22 from that engaged by the spring 25. The lower end of this rod 38 also terminates in an angular extension 40 disposed parallel to and in the same plane with the extension 36 of the rod 34. The free end of the extensions 36 and 40 are mutually connected by a link 41 to which latter said extensions are pivotally secured. The forward end of this link 41 is extended beyond its connection with the extension 40 and is pivotally connected to one end of a two arm lever 42, which latter is pivotally mounted upon a bracket 43 suspended from the frame A. The other end of the lever 41 is pivotally connected to the lower end of a vertically disposed pedal lever 44, which latter is pivotally mounted on the frame A. The upper end of the lever 44 has pivoted thereto a pedal 45 which controls a spring actuated pawl 46 coöperating with a toothed segment 47 mounted upon the vehicle body adjacent the lever 44. By this construction it will be apparent that when the pedal 45 is pressed against so as to throw the upper end of the lever 44 forwardly the extensions 35 and 39 of the rods 34 and 38 respectively will be operated through the medium of the various connections to shift the shaft 24 bodily toward the shaft 15 so as to bring the friction wheel 27 into engagement with the cone 18. When the lever 44 has been operated to effect the engagement of the friction wheel 27 and cone 18 the pawl 46 will engage the toothed segment 47 and lock the various connections between the lever 44 and the shaft 24 against movement. Should it be desired to release the friction wheel 27 from engagement with the cone 18 it is only necessary to press upon the forward end of the pedal 45 which will lift the pawl 46 out of engagement with the segment 47 when the springs 25 and 26 will operate to shift the shaft 24 bodily away from the shaft 15 and this movement of said shaft 24 will return the various connections between the pedal 45 and said shaft to their normal or inactive position.

In order to reverse the direction of rotation of the shaft 24 there is journaled upon the frame A between the shafts 15 and 24 parallel to the latter another shaft 48 upon which is fixed a small idle friction wheel 49 which constantly engages the cone 19. The friction wheel 49 is positioned so that when the friction wheel 27 is adjusted longitudinally of the shaft 24 to its extreme rearward position it will engage the idle friction wheel 49 and result in a reverse rotation of the shaft 24 from that effected by the engagement of the friction wheel 27 with the cone 18.

What is claimed is:

1. In a driving mechanism, the combination of a frame including spaced members, a driving shaft journaled between said spaced members, a friction cone fixed on said driving shaft, journal blocks slidably mounted in corresponding openings in said spaced members respectively, a driven shaft rotatably mounted in said journal blocks, a longitudinally adjustable friction wheel mounted on the driven shaft, springs disposed in the openings in said spaced members respectively and engaging one side of respective journal blocks to normally hold the latter and the driven shaft a sufficient distance from the driving shaft to prevent engagement between the friction wheel and the cone when the former is adjusted longitudinally of the driven shaft, a pair of vertical shafts rotatably supported from said frame one adjacent each of said spaced members an angular extension on the upper end of each of said vertical shafts, said extensions having their free ends disposed respectively in the openings in said spaced members for engagement with the opposite sides of respective journal blocks from those engaged by said springs, and a common means for rotating said vertical shafts simultaneously to force their angular extensions against respective journal blocks whereby said driven shaft is moved bodily toward the driving shaft against the influence of said springs to bring the friction wheel into engagement with the friction cone.

2. In a driving mechanism, the combination of a driving shaft, a driven shaft mounted for bodily movement toward and away from the driving shaft, a friction cone fixed on said driving shaft, a second friction cone fixed on said driving shaft, a longitudinally adjustable friction wheel mounted on the driven shaft for engagement with the first named friction cone, means for normally maintaining the driven shaft a sufficient distance from the driving shaft to prevent engagement between the friction wheel and cone when the former is adjusted longitudinally of the driven shaft, an idle friction wheel constantly in engagement with the second friction cone on the driving shaft and positioned to be engaged by the friction wheel on the driven shaft in one adjustment of the latter to reverse the rotation of said driven shaft, and means for moving said driven shaft bodily toward the driving shaft to bring the friction wheel thereon into engagement with the first named cone or into engagement with the idle friction wheel.

In testimony whereof, I affix my signature, in presence of two witnesses.

THED S. HUTCHINGS.

Witnesses:
 JOE WILLIAMS,
 A. C. HAIGHT.

Copies of this patent may be obtained for five cents each, by addressing the "Commissioner of Patents, Washington, D. C."